United States Patent [19]

Spector

[11] Patent Number: 4,759,937

[45] Date of Patent: Jul. 26, 1988

[54] TECHNIQUE FOR MOLDING EDIBLE POPCORN ART OBJECTS

[76] Inventor: Donald Spector, 380 Mountain Rd., Union City, N.J. 07087

[21] Appl. No.: 633,396

[22] Filed: Jul. 23, 1984

[51] Int. Cl.⁴ .............................................. A23P 1/10
[52] U.S. Cl. ................................... 426/274; 426/104; 426/217; 426/512
[58] Field of Search ................ 426/297, 274, 104, 512

[56] References Cited

U.S. PATENT DOCUMENTS 1,383,290  7/1921  Cressey .............................. 426/104

OTHER PUBLICATIONS

Roth, 1974, Old-Fashioned Candymaking, Henry Regnery Co., Chicago, pp. 143-152.
Arsdale & Emellos, 1949, Candy Recipes and Other Confections, Blue Ribbon Books, Garden City, N.J., pp. 107-116.

*Primary Examiner*—Donald E. Czaja
*Assistant Examiner*—Carolyn Paden
*Attorney, Agent, or Firm*—Michael Ebert

[57] ABSTRACT

A technique for molding pieces of popcorn candy having different geometric shapes that are interfittable, making it possible for the user to integrate the pieces in any desired manner to create art objects that are both displayable and edible and have a flavor predetermined by the user. The technique is carried out by means of a corn popper which converts kernels of corn into a batch of popcorn and a family of molds having different geometric shapes. A bonding agent is prepared by boiling a blend including sugar and syrup to create a molten cream and then adding flavoring thereto. A portion of the molten cream is intermingled with the batch of popcorn and the resultant flowable mix is used to fill the molds. After cooling and hardening, the shaped pieces of popcorn candy are then removed from the mold and interfitted as desired, using the same molten cream to integrate the pieces to form an edible art object.

6 Claims, 2 Drawing Sheets

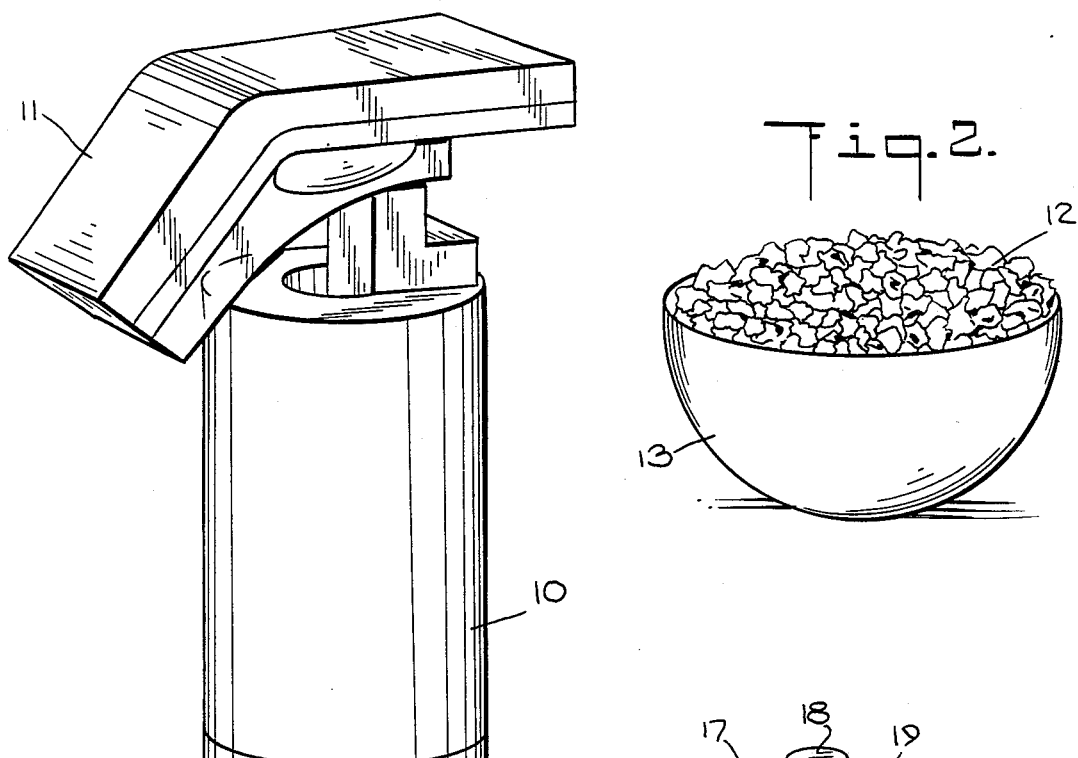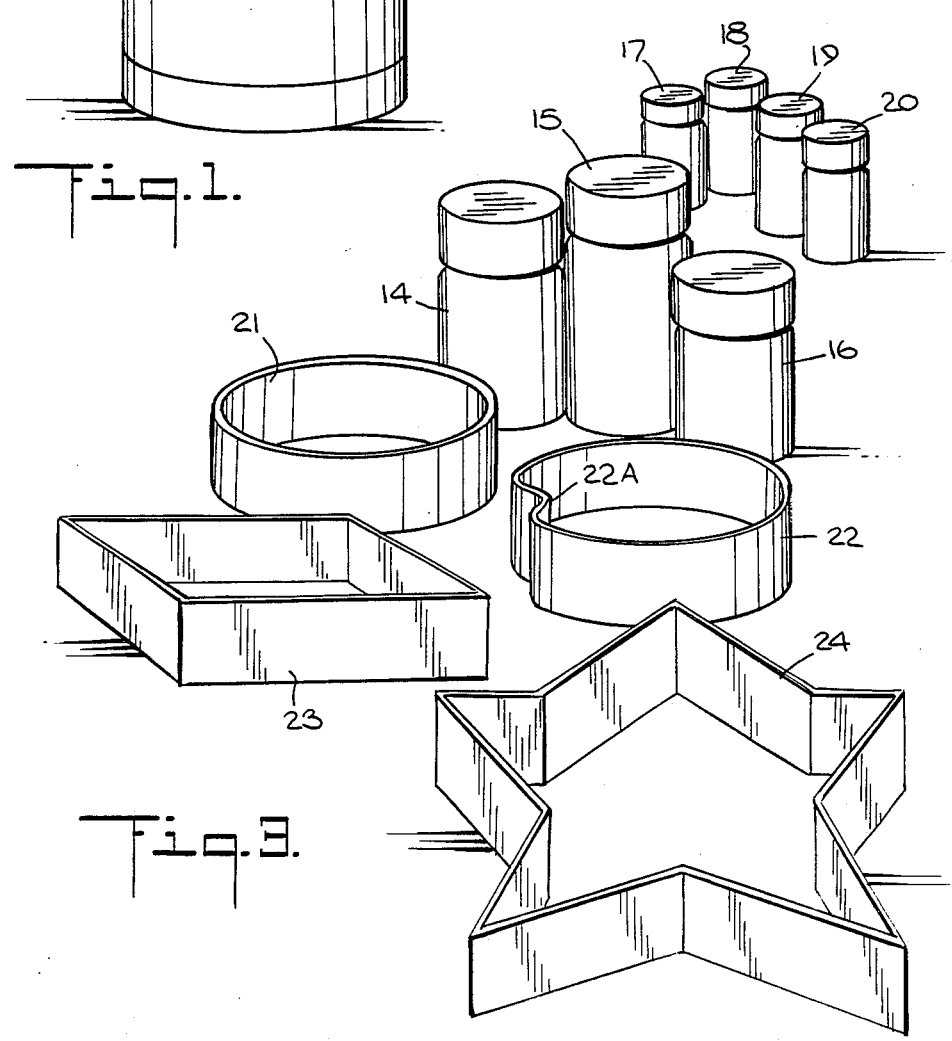

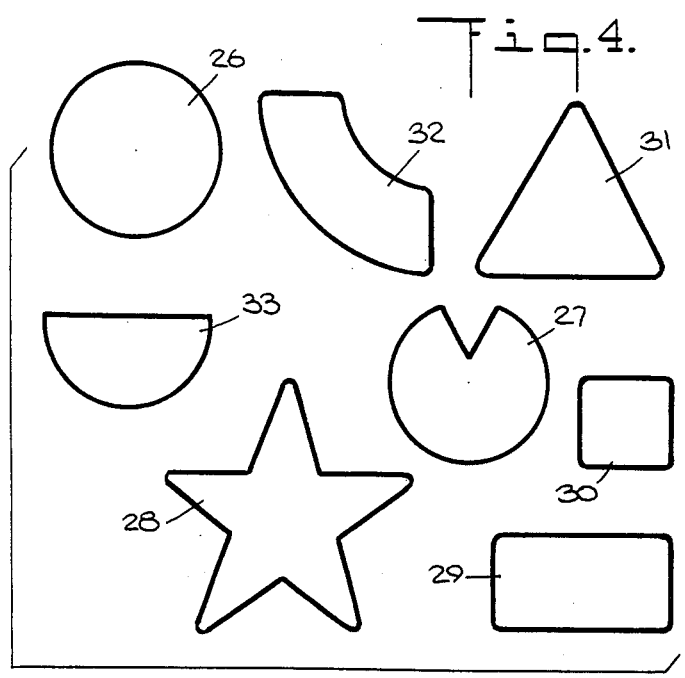
Fig. 4.
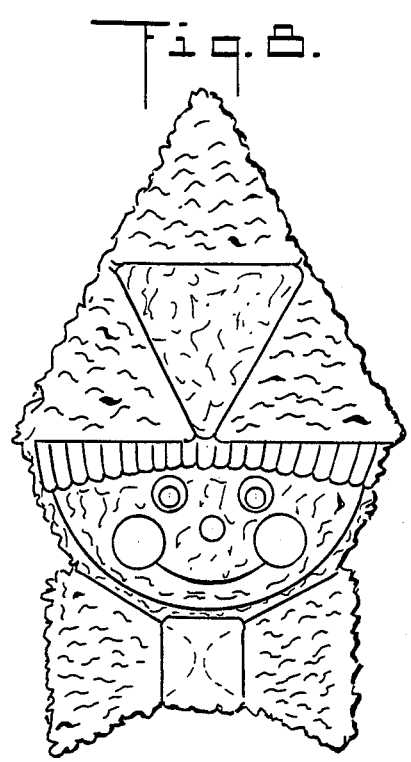
Fig. 8.
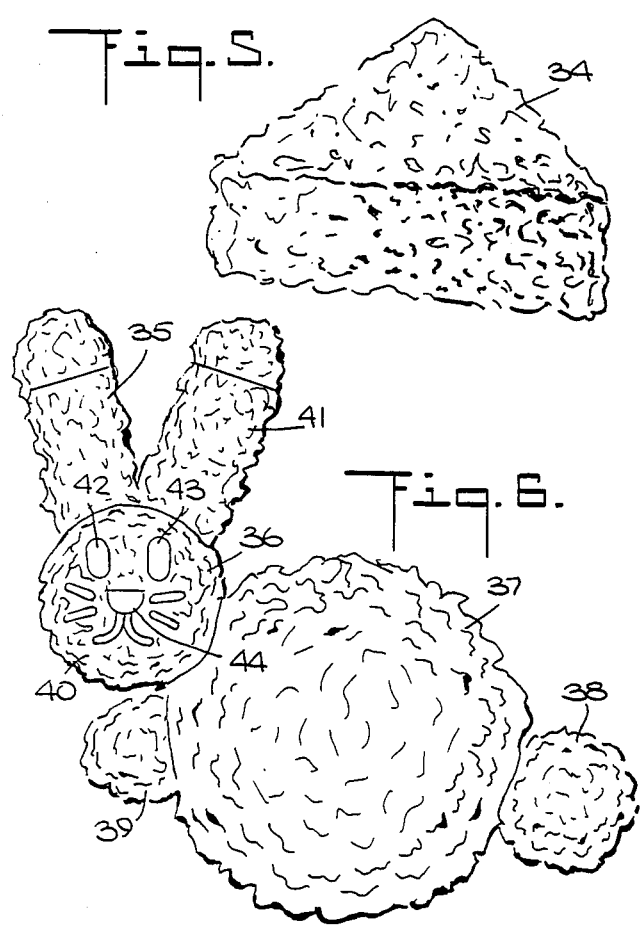
Fig. 5.
Fig. 6.
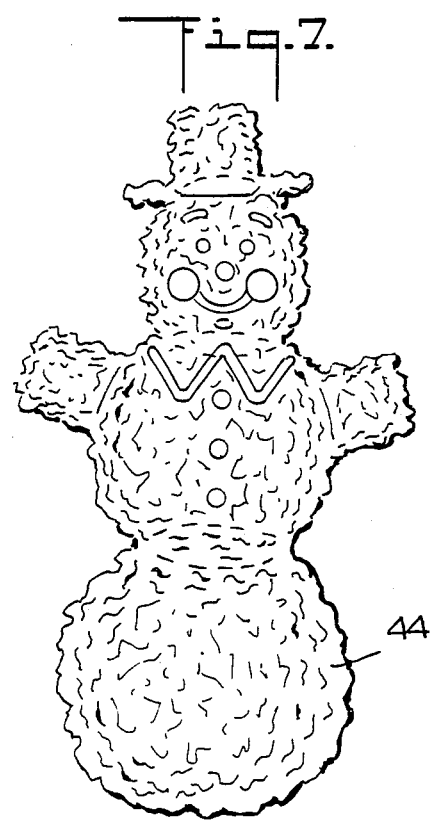
Fig. 7.

TECHNIQUE FOR MOLDING EDIBLE POPCORN ART OBJECTS

BACKGROUND OF INVENTION

1. Field of Invention

This invention relates generally to the molding of edible products, and more particularly to a technique for molding pieces of popcorn candy having different geometric shapes that are interfittable, making it possible to integrate the pieces to create decorative figures or art objects which are both displayable and edible.

2. Prior Art

The term "popcorn" refers to kernels of various hybrids of corn, such as Indian corn, which on exposure to heat burst open to form a white, starchy mass. When such kernels are heated, the moisture trapped therein is volatilized to produce a positive pressure which ruptures the internal structure of the kernel.

Home-use devices are available on the market for popping corn. These fall broadly into two classes—"wet" poppers, which utilize a liquid agent or cooking oil as the popping medium, and "dry" poppers employing a stream of hot air for the same purpose.

In the context of the present invention, "dry" poppers are preferable, for these are available at modest cost as home units produced commercially by such manufacturers as Hamilton-Beach, Wear-Ever and Sunbeam. Apart from the fact that "dry" poppers require no cooking oil is the further advantage that they operate much faster than "wet" poppers. Such units convert a batch of unpopped kernels into a stream of hot popcorn that is discharged into a bowl or other receptacle.

Among the patents which disclose hot-air corn poppers are the U.S. Pat. Nos. 1,648,005 (Pritchard); 3,294,546 (Green), 3,323,440 (Grant) and 3,665,839 (Gottlieb).

It is known to use popcorn rather than nuts to form a caramel candy. This is done by cooking a blend of sugar, water, corn syrup and butter to carmelize the sugar, the resultant hot, creamy fluid then being poured over a batch of freshly prepared popcorn and allowed to cool to form a nutritious carmel corn which has an amorphous form. It is also known to produce chocolate or other candies in figurative forms, but such forms are created at the factory and do not reflect the skill or taste of the purchaser.

SUMMARY OF INVENTION

The object of this invention is to provide a molding technique for producing pieces of popcorn candy having different geometric shapes that are interfittable, thereby making it possible to create decorative figures and art objects which are both displayable and edible, and have a taste or flavor predetermined by the user.

More particularly, an object of this invention is to provide a kit for carrying out the above technique, which kit allows the user to exercise his imagination and develop his artistic skills in creating expressive art forms that can be decorated by the user. Thus the user enjoys a compound pleasure in creating his own edible work of art and in consuming the fruits of his creativity.

Briefly stated, these objects are attained in a technique for molding pieces of popcorn candy having different geometric shapes that are interfittable, making it possible for the user to integrate the pieces in any desired manner to create art objects that are both displayable and edible and have a flavor predetermined by the user. The technique is carried out by means of a corn popper which converts kernels of corn into a batch of popcorn and a family of molds having different geometric shapes. A bonding agent is prepared by boiling a blend including sugar and syrup to create a molten cream and then adding flavoring thereto. A portion of the molten cream is intermingled with the batch of popcorn and the resultant flowable mix is used to fill the molds. After cooling and hardening, the shaped pieces of popcorn candy are then removed from the mold and interfitted as desired, using the same molten cream to integrate the pieces to form an edible art object.

OUTLINE OF DRAWING

For a better understanding of the invention as well as other objects and further features thereof, reference is made to the following detailed description to be read in conjunction with the accompanying drawings, wherein:

FIG. 1 is a perspective view of a standard "dry" corn popper unit;

FIG. 2 shows a bowl filled with popcorn produced by the unit;

FIG. 3 shows a family of differently-shaped molds to be used in carrying out a technique in accordance with the invention, and cannisters containing flavoring and coloring agents;

FIG. 4 shows various possible geometric forms for the molds;

FIG. 5 is a perspective showing one of the pieces of popcorn candy obtained from a mold;

FIG. 6 illustrates one art object produced by integrating the pieces;

FIG. 7 illustrates another such art object; and

FIG. 8 illustrates still another such art object.

DETAILED DESCRIPTION

Referring now to FIG. 1, there is shown a conventional electrically-operated "dry" corn popper 10 which is supplied with kernels of corn, the kernels being subjected in the body of the popper to a stream of hot air produced by an electrical heater operating in conjunction with a fan which acts to pop the kernels. The resultant popcorn is discharged from a chute 11 and is received in a bowl 13, as shown in FIG. 2.

In order to prepare an edible, molten bonding agent for producing popcorn candy pieces in accordance with the invention, sugar is blended with light corn syrup and butter. A typical recipe is one cup of sugar, one cup of syrup and two tablespoons of butter. This blend is cooked under medium heat in a sauce pan or double boiler and brought to a boil (about 240° F.) to produce the desire molten bonding agent having a creamy texture.

After the molten bonding agent is removed from the heater, coloring as well as flavoring may be added thereto. The coloring is any additive which has FDA approval, while the flavoring may be vanilla extract, chocolate and any other known flavoring agent suitable for a food product. One can, to enhance the nutritional value of the product, also add soluble vitamins to the molten bonding agent.

A portion of the freshly-prepared and flavored bonding agent is then thoroughly intermingled with the batch of popcorn 12 in bowl 13 to produce a flowable mix. This mix is used to fill several metal or plastic molds in a family thereof, as shown in FIG. 3. In addition to cannisters 14, 15 and 16 for various flavoring agents and cans 17, 18, 19 and 20 for various coloring agents, FIG. 3 shows four molds 21, 22, 23 and 24 in different geometric forms.

Mold 21 has a circular shape. Mold 22 is also circular but with a triangular side wall indentation 22A. Mold 23 is rectangular in form, while mold 24 is star-shaped.

The four molds shown in FIG. 3 represent only some of the possible interrelated geometric forms assumed in the family of molds in accordance with the invention. Thus, as shown in FIG. 4, among the possible geometric mold forms, in addition to a circle 26, and indented circle 27, a star 28 and a large rectangle 29, is a square 30, a triangle 31, an arcuate segment 32 and a semicircle 33. The more geometric mold forms that are provided to the user, the greater the creative possibilities of the technique.

Before filling the molds with the flowable popcorn mix, they are coated with a release agent or lined with wax paper to prevent adhesion to the mold surface. After the fill in each mold has cooled and the bonding agent has cured or hardened to bond the cluster of popcorn together to form a shaped piece of popcorn candy, the piece is pushed out of the mold. To this end, each mold may be provided with a bottom finger hole to facilitate removal of the piece molded therein.

One such piece 34 of popcorn candy is shown in FIG. 5, where it will be seen that the piece has a triangular form composed of a bonded cluster of edible popcorn whose color and flavor depends on the recipe for the bonding agent. Popcorn is relatively flavorless; but because it is highly absorbent, it assumes the flavor of the molten bonding agent which permeates the pores of the popcorn.

When one has produced several differently-shaped pieces of popcorn candy, these may be fitted together in a mosaic or assembly which assumes the form of an art object. This form may be figurative or abstract, the user of the technique exercising his artistic skills in this regard.

After the user has fitted together the pieces to form an art object, he then integrates the pieces by using the previously-prepared molten bonding agent as the glue for this purpose. When the glue has cooled and solidified, one then has a unitary art object which can be exhibited and later eaten. Because the glue for joining the pieces has the same composition as the glue for the popcorn cluster, the object, though composed of individual pieces, appears to be without seams.

FIG. 6 shows an animal-like art object composed of shaped popcorn candy pieces 35 to 41, so assembled as to create the body, the tail, the head, the legs and the ears of the object. Small pieces of hard candy, such as pieces 42, 43 and 44 in different forms may be bonded to the face by the same molten bonding agent to add features thereto. FIG. 7 shows a man-like figure formed by integrating shaped pieces of popcorn candy, while FIG. 8 shows a boy-like figure made in this fashion.

The variety of art objects created by the technique is limited only by the number of available molds and the imagination of the artist.

While there has been shown and described a preferred embodiment of TECHNIQUE FOR MOLDING EDIBLE POPCORN ART OBJECTS, it will be appreciated that many changes and modifications may be made therein without, however, departing from the essential spirit thereof. Thus the pieces may also be bonded to a background card for display purposes. And as the flavoring and coloring agent one may use "Jello" gelatin powders in different flavors and colors.

Thus, in practice, one may make use of flexible plastic (i.e., polyethylene) molds. This makes it possible, by applying pressure to the mold, to pop the molded piece from the model before it has fully hardened. The advantage of this procedure is that when the same geometric mold is used repeatedly to produce several candy pieces of the same shape in order to create an art object requiring these pieces, it is not necessary to wait until the molded piece has hardened in the mold, for one can pop the piece and permit it to fully harden on the table and immediately refill the mold with the mix to produce another piece of the same shape, thereby speeding up the production of pieces.

I claim:

1. The method of forming art objects in any one of a wide variety of forms as determined by the operator comprising the steps of:

A. preparing a batch of popcorn by subjecting kernels of corn to a stream of hot air and placing it in a bowl;
   B. preparing a edible molten bonding agent by boiling a blend including sugar and corn syrup to create a molten cream;
   C. intermingling a portion of the cream with the batch in the bowl to form a flowable mix;
   D. filling a family of molds all having the same uniform depth but with vertical sides defining different geometric shapes with the mix and allowing the cream to cool and harden to form shaped candy pieces in the form of slabs of uniform thickness whose edges reflect the geometry of the molds which are then removed from the molds;
   E. interfitting the pieces with their edges in abutting relation to create an art object having a form determined by the operator; and
   F. gluing the pieces together with the molten cream to unify the art object.

2. The method as set forth in claim 1, wherein said blend includes butter.

3. The method as set forth in claim 1, further including the steps of adding coloring and a flavoring agent to the molten agent.

4. The method as set forth in claim 1, wherein said family of molds includes circular, triangular, rectangular and star shapes.

5. The method as set forth in claim 1, wherein each of said molds are formed of flexible material making it possible to pop a piece from the mold before it has fully hardened.

6. The method as set forth in claim 5, wherein said molds are formed of polyethylene.

* * * * *